US012731860B2

(12) United States Patent
Kim et al.

(10) Patent No.: US 12,731,860 B2
(45) Date of Patent: Sep. 8, 2026

(54) COATING COMPOSITION FOR SEPARATOR

(71) Applicants: W-SCOPE KOREA CO.,LTD., Cheongju-si (KR); W-SCOPE CHUNGJU PLANT CO., LTD, Chungju-si (KR)

(72) Inventors: Byung Hyun Kim, Cheongwon-gu (KR); Dae Bog Park, Cheonan-si (KR); Seok Hyeon Gong, Gongju-si (KR); Kwang Ho Choi, Cheongju-si (KR); Jeong Rae Kim, Seoul (KR)

(73) Assignees: W-SCOPE KOREA CO., LTD., Cheongju-si (KR); W-SCOPE CHUNGJU PLANT CO., LTD, Chungju-si (KR)

( * ) Notice: Subject to any disclaimer, the term of this patent is extended or adjusted under 35 U.S.C. 154(b) by 509 days.

(21) Appl. No.: 18/362,849

(22) Filed: Jul. 31, 2023

(65) Prior Publication Data

US 2023/0378604 A1 Nov. 23, 2023

Related U.S. Application Data

(63) Continuation of application No. PCT/KR2022/003187, filed on Mar. 7, 2022.

(30) Foreign Application Priority Data

May 27, 2021 (KR) ........................ 10-2021-0068390

(51) Int. Cl.
*H01M 50/443* (2021.01)
*C08F 220/14* (2006.01)
(Continued)

(52) U.S. Cl.
CPC ......... *H01M 50/443* (2021.01); *C08F 220/14* (2013.01); *C09D 133/12* (2013.01);
(Continued)

(58) Field of Classification Search
CPC ............. H01M 50/443; H01M 50/489; H01M 50/461; H01M 50/451; H01M 50/42;
(Continued)

(56) References Cited

U.S. PATENT DOCUMENTS 4,427,836 A * 1/1984 Kowalski ................. C09D 7/70 525/902
5,157,084 A * 10/1992 Lee ........................ D21H 21/54 525/902
(Continued)

FOREIGN PATENT DOCUMENTS

EP 3609004 A1 2/2020
JP 2016-072197 A 5/2016
(Continued)

OTHER PUBLICATIONS

Machine translation of Akiike JPWO-2013147006-A1. (Year: 2013).*
International Search Report issued in PCT/KR2022/003187; mailed Jun. 17, 2022.

*Primary Examiner* — Basia A Ridley
*Assistant Examiner* — Julia Marie Fehr
(74) *Attorney, Agent, or Firm* — Studebaker Brackett PLLC

(57) ABSTRACT

One aspect of the present invention provides a coating composition for a separator including a water-soluble polymer and a water-insoluble polymer, wherein the water-insoluble polymer includes solid particles and annular hollow particles, and an electrode-adhesive separator, which includes an adhesive layer made of the coating composition.

8 Claims, 2 Drawing Sheets

(51) Int. Cl.

| | |
|---|---|
| ***C09D 133/12*** | (2006.01) |
| ***C09J 133/12*** | (2006.01) |
| ***H01M 10/052*** | (2010.01) |
| ***H01M 50/409*** | (2021.01) |
| ***H01M 50/411*** | (2021.01) |
| ***H01M 50/417*** | (2021.01) |
| ***H01M 50/42*** | (2021.01) |
| ***H01M 50/446*** | (2021.01) |
| ***H01M 50/449*** | (2021.01) |
| ***H01M 50/451*** | (2021.01) |
| ***H01M 50/46*** | (2021.01) |
| ***H01M 50/489*** | (2021.01) |

(52) U.S. Cl.

CPC ......... *C09J 133/12* (2013.01); *H01M 10/052* (2013.01); *H01M 50/409* (2021.01); *H01M 50/411* (2021.01); *H01M 50/417* (2021.01); *H01M 50/42* (2021.01); *H01M 50/446* (2021.01); *H01M 50/449* (2021.01); *H01M 50/451* (2021.01); *H01M 50/461* (2021.01); *H01M 50/489* (2021.01); *C09J 2203/33* (2013.01)

(58) Field of Classification Search

CPC ............. H01M 50/417; H01M 10/052; H01M 50/409; H01M 50/411; H01M 50/446; H01M 50/449; C08F 220/14; C09D 133/12; C09J 133/12; C09J 2203/33

See application file for complete search history.

(56) References Cited

U.S. PATENT DOCUMENTS

| | | | | |
|---|---|---|---|---|
| 9,711,773 | B2 * | 7/2017 | Lai | H01M 50/414 |
| 2005/0208383 | A1 * | 9/2005 | Totsuka | H01M 50/457<br>429/247 |
| 2015/0333308 | A1 * | 11/2015 | Toyoda | H01M 50/461<br>429/144 |
| 2016/0380250 | A1 * | 12/2016 | Umeyama | H01M 50/454<br>429/145 |
| 2020/0127263 | A1 * | 4/2020 | Annaka | H01M 10/058 |
| 2024/0234959 | A1 * | 7/2024 | Machida | H01M 50/446 |
| 2024/0322374 | A1 * | 9/2024 | Sato | H01M 10/0525 |

FOREIGN PATENT DOCUMENTS

| | | | | |
|---|---|---|---|---|
| KR | 10-2005-0085885 | A | 8/2005 | |
| KR | 10-2014-0050877 | A | 4/2014 | |
| KR | 10-2017-0047723 | A | 5/2017 | |
| KR | 10-1750329 | B1 | 6/2017 | |
| KR | 10-2019-0084893 | A | 7/2019 | |
| KR | 10-2020-0061576 | A | 6/2020 | |
| KR | 10-2020-0129673 | A | 11/2020 | |
| WO | WO-2013147006 | A1 * | 10/2013 | H01M 50/42 |

* cited by examiner

PREPARATION EXAMPLE 3

PREPARATION EXAMPLE 5

COMPARATIVE PREPARATION EXAMPLE 1

COATING COMPOSITION FOR SEPARATOR

CROSS-REFERENCE TO RELATED APPLICATION

This application is based on the PCT Application No. PCT/KR2022/003187, filed on Mar. 7, 2022, and claims the benefit of priority from Korean Patent Application No. 10-2021-0068390, filed on May 27, 2021, the disclosures of which are incorporated herein by reference in its entirety.

TECHNICAL FIELD

The present invention relates to a coating composition for a separator, and more particularly, to a coating composition for a separator, which provides electrode adhesiveness to the surface of a separator, and thus can effectively prevent decreased air permeability.

BACKGROUND ART

Lithium secondary batteries are widely used as power sources for various types of electrical products requiring miniaturization and a light weight, such as smart phones, notebook computers, tablet PCs, etc., and as the application field is widened from smart grids to mid-to-large-size batteries for electric vehicles, the development of lithium secondary batteries with high capacity, a long lifetime, and high stability is required.

To attain the above purpose, research and development for separators with micropores, which separate a positive electrode and a negative electrode from each other to prevent an internal short, and facilitate the migration of lithium ions, and particularly, a microporous separator using a polyolefin such as polyethylene, which is advantageous for forming pores by thermally-induced phase separation, economical, and easily meets the physical properties required for separators, are actively being conducted.

However, a separator using polyethylene with a low melting point of approximately 135° C. may undergo shrinkage and transformation at a high temperature above the melting point due to heat generation of a battery. When a short circuit occurs due to such a transformation, the thermal runaway of the battery may cause safety problems such as ignition.

Meanwhile, a polyolefin-based separator, which has been conventionally used in a wide range, has poor heat resistance and mechanical strength, so when exposed to a temperature of 150° C. for approximately 1 hour, 50 to 90% thermal shrinkage occurs, resulting in loss of the function of the separator, and a high possibility of internal short circuit in case of an external impact. To compensate for this problem, a technique of coating a heat-resistant layer containing ceramic particles on the surface of the separator has been proposed.

However, this heat-resistant layer faces considerable technical challenges in terms of air permeability and conductivity (resistance), which are factors having a very important effect on separator performance. That is, when a heat-resistant layer including ceramic particles is formed on the surface of a porous substrate, the heat resistance of the separator is improved, but the ceramic particles included in the heat-resistant layer block the pores formed in the porous substrate to reduce the air permeability of the separator and thus greatly reduce an ion migration path between the positive electrode and the negative electrode, resulting in greatly reducing the charge and discharge performance of the secondary battery.

In addition, as the heat-resistant layer is continuously exposed to an electrolyte in the battery, the ceramic particles may be partially and continuously detached from the porous substrate, and in this case, the heat resistance of the separator may also be gradually decreased.

Meanwhile, an attempt has been made to improve the adhesive strength with an electrode and accordingly improve the lifetime characteristics of a secondary battery by further forming an adhesive layer including a PVDF-HFP copolymer to express adhesive strength on a polyolefin-based separator or heat-resistant layer with an electrode (Korean Patent Application No. 10-2012-0117249). However, generally, since such a PVDF-based binder is also a lipophilic material and uses a volatile organic material as a solvent, there is a problem of adversely affecting the health of a worker during coating and drying processes.

Therefore, while an aqueous coating solution in which PVDF-based polymer particles are dispersed in water has been developed and applied, since the PVDF-based polymer particles are present in a particulate form even after the coating solution is dried, PVDF-based polymer particles included in the adhesive layer, like in the heat-resistant layer, block pores formed in a porous substrate and/or the heat-resistant layer, thereby degrading the air permeability of a separator, and thus greatly reducing ion migration paths between a positive electrode and a negative electrode, resulting in greatly degrading the charging and discharging performance of a secondary battery.

DISCLOSURE

Technical Problems

To solve the above-described problems in the related art, the present invention is directed to providing a coating composition for an electrode-adhesive separator, which is capable of achieving a balance of heat resistance, adhesiveness, air permeability and conductivity, and a separator including the same.

Technical Solutions

One aspect of the present invention provides a coating composition for a separator, which includes a water-soluble polymer and a water-insoluble polymer, wherein the water-insoluble polymer includes solid particles and annular hollow particles.

In one embodiment, the solid particles may have a core-shell structure including a core, and a shell covering at least a part of the surface of the core.

In one embodiment, the solid particles may include first solid particles having an average particle diameter of 0.3 μm or less, and second solid particles having average particle diameter of more than 0.3 μm.

In one embodiment, the annular hollow particles may include an annular shell having a through hole formed in the middle, and a filling material and a hollow, which are formed inside the annular shell.

In one embodiment, the average diameter of the through hole may be larger than the average particle diameter of the first solid particles.

In one embodiment, the proportion of the filling material in the annular shell may be 1 to 99 vol %.

In one embodiment, the content of the annular hollow particles in the water-insoluble polymer may be 10 to 50 wt %.

Another aspect of the present invention provides a separator, which includes a porous base film; and an adhesive layer disposed on one surface of the porous base film and consisting of the coating composition for a separator.

In one embodiment, the porous base film may include a porous substrate, and a heat-resistant layer disposed on at least one surface of the porous substrate and including a plurality of inorganic particles bound by a binder.

In one embodiment, the separator may satisfy one or more of the following conditions (i) to (v).

(i) Fs≤190 sec/100 mL (Fs is the air permeability of the separator); (ii) Rs≤100 mΩ (Rs is the resistance of the separator); (iii) thermal shrinkage of 2.5% or less at 150° C. in a machine direction; (iv) 0 sec/100 mL<Fs−Fb≤20 sec/100 mL (Fb is the air permeability of the base film); and (v) 0 mΩ<Rs−Rb≤10 mΩ (Rb is the resistance of the base film).

Advantageous Effects

A coating composition for a separator according to one aspect of the present invention includes a water-soluble polymer and a water-insoluble polymer, and as a part of the water-insoluble polymer consists of annular hollow particles having a through hole formed in the middle, a balance between heat resistance, adhesiveness, air permeability and conductivity may be realized.

It should be understood that the effect of the present invention is not limited to the above-described effects, and includes all effects that can be deduced from the configuration of the present invention described in the detailed description or claims of the present invention.

MODES OF THE INVENTION

Figure 1:
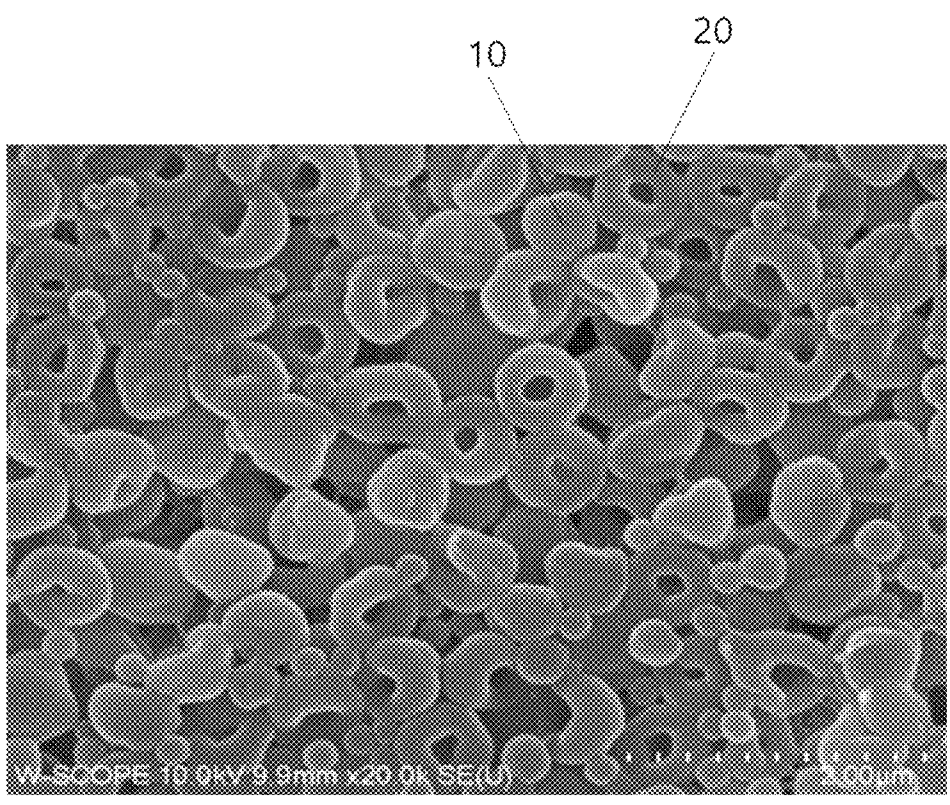
FIG. 1 is an SEM image of a coating composition for a separator according to one embodiment of the present invention.

Hereinafter, the present invention will be described in detail with reference to the accompanying drawings. However, the present invention may be implemented in a variety of different forms, and is not limited to the embodiments described herein. In addition, in the drawings, for clear explanation of the present invention, parts that are not related to the description are omitted, and like numerals denote like parts throughout the specification.

Throughout the specification, when a part is "connected" with another part, it means that the one part is "directly connected," or "indirectly connected" with a third member therebetween. In addition, when a certain part "includes" a certain component, it means that, unless particularly stated otherwise, another component may be further included, rather than excluding the other component.

Hereinafter, embodiments of the present invention will be described in detail with reference to the accompanying drawings.

One aspect of the present invention provides a coating composition for a separator, which includes a water-soluble polymer and a water-insoluble polymer, wherein the water-insoluble polymer includes solid particles and annular hollow particles.

FIG. 1 is an SEM image of a coating composition for a separator according to one embodiment of the present invention. Referring to FIG. 1, the coating composition for a separator may include a water-soluble polymer and a water-insoluble polymer, and the water-insoluble polymer may include solid particles 10 and annular hollow particles 20.

The term "water-insoluble polymer" used in the specification refers to a polymer having the characteristic of being dispersed or suspended in the form of microparticles in water without being dissolved in water, and is referred to a latex or emulsion. The water-insoluble polymer may have a microparticle form in an adhesive layer of the separator, which will be described below.

Meanwhile, the term "water-soluble polymer" used in the specification refers to a polymer that is dissolved in water and has characteristic of not exhibiting the form of particles. The water-soluble polymer is melted and fused to an adhesive layer of the separator, which will be described below, not only to adhere the water-insoluble polymer particles to each other, but also to adhere the water-insoluble polymer particles to the porous base film.

In addition, the term "solid particle" used in the specification refers to a particle filled with a predetermined material without an empty space inside the particle, and the term "hollow particle" used in the specification refers to a particle with an empty space of a predetermined volume inside the particle.

Figure 2:
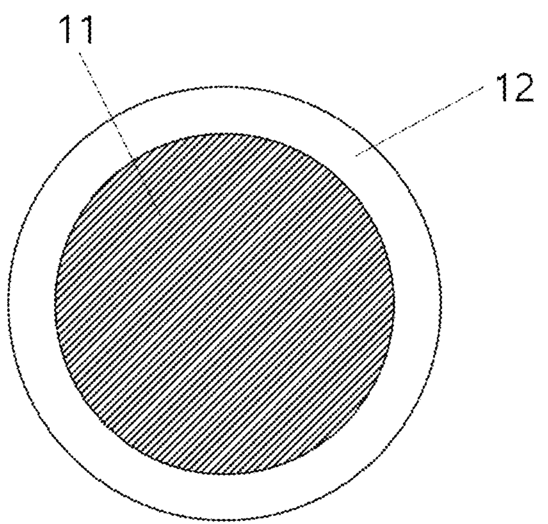
FIG. 2 is a cross-sectional view of a solid particle according to one embodiment of the present invention.

FIG. 2 is a cross-sectional view of a solid particle according to one embodiment of the present invention. Referring to FIG. 2, the solid particle 10 may have a core-shell structure including a core 11, and a shell 12 covering at least a part of the surface of the core, and preferably, the ensure surface thereof.

A monomer that constitutes a polymer of the core 11 in the solid particle may be, for example, at least one selected from the group consisting of a vinyl chloride-based monomer such as vinyl chloride or vinylidene chloride; a vinyl acetate-based monomer such as vinyl acetate; an aromatic vinyl monomer such as styrene, α-methyl styrene, styrene sulfonic acid, butoxystyrene, or vinyl naphthalene; a vinylamine-based monomer such as vinylamine; a vinylamide-based monomer such as N-vinylformamide or N-vinylacetamide; an acid group-containing monomer such as a carboxylic acid group-containing monomer, a sulfonic acid group-containing monomer, a phosphoric acid group-containing monomer, or a hydroxyl group-containing monomer; a (meth)acrylic acid derivative such as 2-hydroxyethyl methacrylate; a (meth)acrylic acid ester monomer such as methyl acrylate, ethyl acrylate, methyl methacrylate, ethylmethacrylate, or 2-ethylhexyl acrylate; a (meth)acrylonitrile monomer such as acrylonitrile or methacrylonitrile; a (meth) acrylate monomer such as fluorine-containing 2-(perfluorohexyl)ethylmethacrylate or 2-(perfluorobutyl)ethylacrylate; a maleimide derivative such as maleimide or phenylmaleimide; a diene-based monomer such as 1,3-butadiene or isoprene; and a combination of two or more thereof, preferably, a (meth)acrylic acid ester monomer, or a (meth)

acrylonitrile monomer, and more preferably, a (meth)acrylic acid ester monomer, but the present invention is not limited thereto.

In addition, the polymer of the core 11 may include an acid group-containing monomer. The acid group-containing monomer may be, for example, one selected from the group consisting of a carboxylic acid group-containing monomer, a sulfonic acid group-containing monomer, a phosphoric acid group-containing monomer, a hydroxyl group-containing monomer, and a combination of two or more thereof, but the present invention is not limited thereto.

The carboxylic acid group-containing monomer may be, for example, a monocarboxylic acid or dicarboxylic acid, wherein the monocarboxylic acid may be acrylic acid, methacrylic acid, or crotonic acid, and the dicarboxylic acid may be maleic acid, fumaric acid, or itaconic acid.

The sulfonic acid group-containing monomer may be, for example, vinylsulfonic acid, methyl vinyl sulfonic acid, methallyl sulfonic acid, 2-sulfoethyl methacrylate, 2-acrylamido-2-methylpropane sulfonate, or 3-allyloxy-2-hydroxypropane sulfonate.

The phosphoric acid group-containing monomer may be, for example, 2-methacryloyloxyethyl phosphate, methyl-2-methacryloyloxyethyl phosphate, or ethyl-methacryloyloxyethyl phosphate.

The hydroxyl group-containing monomer may be, for example, 2-hydroxyethyl acrylate, 2-hydroxypropyl acrylate, 2-hydroxyethyl methacrylate, or 2-hydroxypropyl methacrylate.

In addition, the polymer of the core 11 may further include a crosslinkable monomer. The crosslinkable monomer may be a monomer capable of forming a crosslinked structure during or after polymerization by energy such as heat or light.

The crosslinkable monomer may be a multifunctional monomer with two or more polymerization reactive groups. The multifunctional monomer may be, for example, one selected from the group consisting of a divinyl compound such as divinyl benzene; a di(meth)acrylic acid ester compound such as diethylene glycol dimethacrylate, ethylene glycol dimethacrylate, diethylene glycol diacrylate, or 1,3-butylene glycol diacrylate; a tri(meth)acrylic acid ester compound such as trimethylpropanetrimethacrylate or trimethylpropanetriacrylate; an ethylenically unsaturated monomer containing an epoxy group, such as allylglycidylether or glycidylmethacrylate; or a combination of two or more thereof.

A monomer constituting the polymer of the shell 12 in the solid particle may be the same as or different from the monomer constituting the polymer of the core 11.

The type of available monomer is the same as described above, and preferably an aromatic vinyl monomer, and more preferably, styrene or a styrene derivative such as styrene sulfonic acid, but the present invention is not limited thereto. As needed, the polymer of the shell 12 may further include the acid group-containing monomer or crosslinkable monomer, which has been described above.

The solid particle may include a first solid particle having an average particle diameter of 0.3 μm or less, and preferably, 0.1 to 0.3 μm, and a second solid particle having an average particle diameter of more than 0.3 μm, and preferably more than 0.3 μm and 0.7 μm or less. The solid particle may be directed connected with each other or adhered by the water-soluble polymer in an adhesive layer of the separator, which will be described above, and a plurality of pores may be formed by gaps between the solid particles.

Among these solid particles, a gap between the second solid particles with a relatively large average particle diameter may form a large pore, and a gap between the first solid particles with a relatively small average particle diameter may form a small pore. The large pore formed by the gap between the second solid particles may contribute to the air permeability, ionic conductivity, and resistance of the separator, but may reduce the surface area of the adhesive layer to degrade the adhesiveness of the separator. The first solid particles may compensate for and enhance the degraded adhesiveness due to the second solid particles by increasing the surface area of the adhesive layer.

The content of the first solid particles in the water-insoluble polymer may be 20 to 80 wt %, and preferably, 35 to 70 wt %. When the content of the first solid particles is less than 20 wt %, adhesiveness may be degraded, and when the content of the first solid particles is more than 80 wt %, air permeability, ionic conductivity, and resistance may be degraded.

The content of the second solid particles in the water-insoluble polymer may be 10 to 30 wt %, and preferably, 15 to 25 wt %. When the content of the second solid particles is less than 10 wt %, air permeability, ionic conductivity, and resistance may be degraded, and when the content of the second solid particles is more than 30 wt %, adhesiveness may be degraded.

The solid particle having a core-shell structure may be prepared by sequentially polymerizing monomers constituting a polymer of the core 11 and monomers constituting a polymer of the shell 12 while changing the proportions of these monomers.

Specifically, a particulate polymer constituting the core may be obtained by mixing the monomer constituting the polymer of the core with an emulsifier, and performing emulsion polymerization, and then a solid particle having a core-shell structure may be obtained by the divided or continuous input of the monomer constituting the polymer of the shell in the presence of the particulate polymer.

Figure 3A:
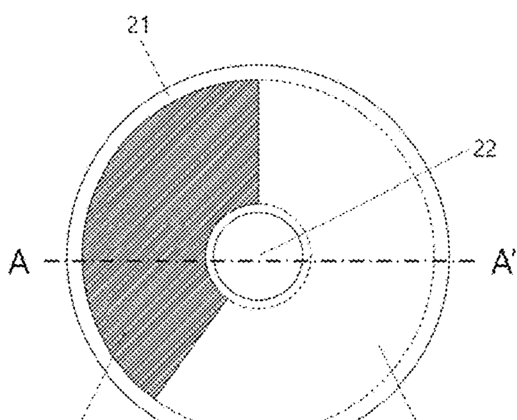
FIGS. 3A and 3B show a plan view and a cross-sectional view of a annular hollow particle according to one embodiment of the present invention.
Figure 3B:
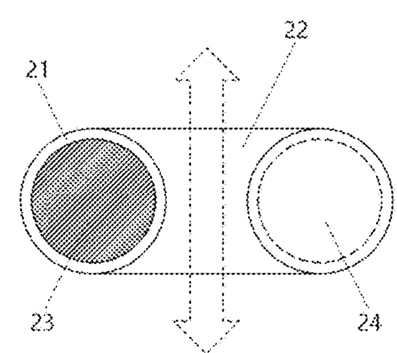

FIG. 3A is a plan view of a annular hollow particle according to one embodiment of the present invention, and FIG. 3B is a cross-sectional view of FIG. 3A along line A-A'. Referring to FIGS. 3A and 3B, the annular hollow particle 20 may include an annular shell 21 having a through hole 22 formed in the middle, and the annular shell 21 may include a filling material 23 and a hollow 24 therein.

It is analyzed that the annular hollow particle 20 is formed in the process of enlarging the core of the solid particle by aging a solid particle 10 for a predetermined time by decreasing the temperature of a reaction system after preparing the solid particle 10 having a core-shell structure. Specifically, when the solid particle is aged for 3 hours or more, preferably, 5 to 30 hours, and more preferably, 10 to 24 hours under the condition in which the temperature is lowered 10° C. or more from the temperature of the reaction system for polymerizing the shell, the temperature may exceed the bulk critical temperature of the enlarged core to rupture the core and/or the shell, and the annular hollow particle 20 in which a through hole 22 is formed in the center may be generated by the rupture.

As such, since the annular hollow particle 20 is derived from the solid particle having a core-shell structure, the annular shell 21 and a polymer constituting the filling material 23 included in the annular shell 21 may be the same as the polymers of the shell 12 and the core 11 of the solid particle 10, respectively, and the type of monomers constituting each polymer is the same as described above.

Since the through hole 22 provides a path through which ions and/or a fluid can pass through an adhesive layer of a separator, which will be described later, together with a plurality of pores formed by gaps between the water-insoluble polymer particles, the conventional problem in which the air permeability, ionic conductivity and resistance of the separator are degraded due to the addition of one or more functional layers (a heat-resistant layer, an adhesive layer, etc.) to one surface of the porous base film may be alleviated.

The average diameter of the through hole 22 formed in the middle of the annular hollow particle 20 may be larger than the average particle diameter of the first solid particles. When the average diameter of the through hole 22 is equal to or less than the average particle diameter of the first solid particles, the first solid particles may arbitrarily block the through hole 22 to degrade the air permeability, ionic conductivity and resistance of the separator.

The proportion of the filling material 23 in the annular shell 21 may be 1 to 99 vol %. When the proportion of the filling material 23 is less than 1 vol %, the annular hollow particle 20 may be easily deformed or destroyed, and when the proportion of the filling material 23 is more than 99 vol %, the shape of the annular hollow particle may not be stably maintained due to additional expansion of the filling material 23 during exposure to an electrolyte.

The content of the annular hollow particles in the water-insoluble polymer may be 10 to 50 wt %, preferably, 20 to 50 wt %, and more preferably, 35 to 50 wt %. When the content of the annular hollow particles in the water-insoluble polymer is less than 10 wt %, the air permeability, ionic conductivity and resistance of the separator including the adhesive layer may be degraded, and when the content of the annular hollow particles in the water-insoluble polymer is more than 50 wt %, heat resistance may be degraded.

Another aspect of the present invention provides a separator, which includes a porous base film; and an adhesive layer disposed on at least one surface of the porous base film and made of the coating composition for a separator.

The porous base film may be a porous film formed by molding and processing a thermoplastic resin. The porous film may include a plurality of pores with a substantially uniform average size, and such pores may contribute to the improvement in resistance and ionic conductivity of the separator. In addition, the separator may be formed as a thin film with a required thickness due to having high porosity and high mechanical strength.

The porosity of the porous film may be 30 to 90 vol %, preferably, 40 to 80 vol %, and more preferably, 40 to 70 vol %. The term "porosity" used in the specification refers to a ratio of the volume occupied by pores to the total volume in any porous article. When the porosity of the porous film is less than 30 vol %, air permeability and ionic conductivity may be degraded, and when the porosity of the porous film is more than 90 vol %, mechanical properties such as tensile strength and puncture strength may be degraded.

The average size of the pores included in the porous film may be 10 to 100 nm, preferably, 20 to 80 nm, and more preferably, 30 to 60 nm. When the average size of the pores is less than 10 nm, air permeability and ionic conductivity may be degraded, and when the average size of the pores is more than 100 nm, mechanical properties such as tensile strength and puncture strength may be degraded.

The thickness of the porous film may be 5 to 20 μm, preferably, 5 to 15 μm, and more preferably, 5 to 12 μm to form a thinner electrochemical device with a high energy density. When the thickness of the porous film is less than 5 μm, mechanical properties may be degraded, and when the thickness of the porous film is more than m, air permeability and ionic conductivity may be degraded.

When the porous substrate includes a polymer resin having an electrical insulation property, the polymer resin may include a thermoplastic resin in consideration of shutdown characteristics. The term "shutdown characteristic" used in the specification refers to the obstruction of ion migration by the blockage of a porous substrate with a melted polymer resin when the temperature of a battery is increased by overheating. From this point of view, the melting point of the polymer resin or the thermoplastic resin may be 200° C. or less.

The thermoplastic resin may include, for example, one selected from the group consisting of polyethylene, polypropylene, polybutylene, polymethyl pentene, ethylene vinyl acetate, ethylene butyl acrylate, ethylene ethyl acrylate, and a combination or copolymer of two or more thereof, preferably, at least one of polyethylene and polypropylene, and more preferably, polyethylene, but the present invention is not limited thereto.

The polyethylene may be one selected from the group consisting of ultra-high-molecular weight polyethylene (UHMWPE, Mw: 1,000,000 to 7,000,000 g/mol), high-molecular weight polyethylene (HMWPE, Mw: 100,000 to 1,000,000 g/mol), high-density polyethylene (HDPE, Mw: 100,000 to 1,000,000 g/mol), low-density polyethylene (LDPE, Mw: 10,000 to 100,000 g/mol), homogeneous linear polyethylene, and linear low-density polyethylene (LLDPE), and a combination of two or more thereof.

For example, the polyethylene may be a high-density polyethylene having a weight average molecular weight ($M_w$) of 250,000 to 450,000. When the weight average molecular weight of the polyethylene is more than 450,000, viscosity may increase and processability may be degraded, and when the weight average molecular weight of the polyethylene is less than 250,000, viscosity may be excessively lowered, resulting in extremely low dispersibility of a pore-forming agent, an antioxidant, etc. when used to form a porous film, and phase separation or layer separation in some cases.

In addition, the porous base film uses the porous film as a substrate, and may further include a heat-resistant layer including a plurality of inorganic particles which are disposed on at least one surface of the base and bound by a binder. The heat-resistant layer may include a plurality of pores formed by gaps between adjacent inorganic particles, and the average size of such pores may be substantially uniform.

The content of the inorganic particles in the heat-resistant layer may be 60 to 99 wt %. When the content of the inorganic particles is less than 60 wt %, heat resistance may not be imparted to a required level, and when the content of the inorganic particles is more than 99 wt %, the air permeability, ionic conductivity and resistance of the separator may be degraded, and the dispersibility of the inorganic particles may be degraded or the workability and processability in slurry coating may be degraded.

The average particle diameter of the inorganic particles may be larger than the average size of the pores included in the porous film. When the average particle diameter of the inorganic particles is less than the average size of the pores included in the porous film, the inorganic particles may penetrate into the pores of the porous film to block the pores, thereby considerably degrading the air permeability and ionic conductivity of the separator. The average particle diameter of the inorganic particles may be 100 to 1,000 nm, preferably, 200 to 800 nm, and more preferably, 400 to 800 nm, but the present invention is not limited thereto.

The thickness of the heat-resistant layer may be 0.1 to 5 μm. When the thickness of the heat-resistant layer is less than 0.1 μm, a required level of heat resistance may not be imparted, and when the thickness of the heat-resistant layer is more than 5 μm, the separator may become thicker to inhibit the formation of a smaller electrochemical device and the integration thereof.

The inorganic particles may be, for example, one selected from the group consisting of $SiO_2$, AlO(OH), $Mg(OH)_2$, $Al(OH)_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $Al_2O_3$, SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and a combination of two or more thereof, and preferably, AlO(OH), but the present invention is not limited thereto.

The binder may be melted and fused to the heat-resistant layer not only to bind the inorganic particles to each other, but also to adhere the inorganic particles to the porous substrate. The binder may be a water-soluble polymer. The water-soluble polymer may be, for example, one selected from the group consisting of polyacrylic acid, polyvinylpyrrolidone, polyvinyl acetate, polyimide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethylcellulose, polyvinyl alcohol, polyethylene oxide, polyethylene glycol, and a combination of two or more thereof, and preferably, polyvinyl alcohol, but the present invention is not limited thereto.

At least one surface of the porous base film may include an adhesive layer made of the coating composition for a separator. The adhesive layer may contribute to improvements in the electrochemical characteristics and lifetime characteristics of a battery by enhancing the bonding strength between the separator and an electrode.

The adhesive layer may be made of a coating composition for a separator, which includes the water-soluble polymer and the water-insoluble polymer, and specifically, the water-insoluble polymer having a particle form may have a structure adhered by the water-soluble polymer. In the adhesive layer, the water-soluble polymer and the water-insoluble polymer may be uniformly dispersed.

The adhesive layer may include a plurality of pores formed by gaps between adjacent water-insoluble polymer particles, that is, organic particles, and the average size of such pores may be substantially uniform. In addition, a part of the water-insoluble polymer consists of annular hollow particles in which a through hole is formed in the middle, and since the through hole provides a path through which ions and/or a fluid can passes through, together with a plurality of pores formed by gaps between the organic particles, the conventional problem in which the air permeability, ionic conductivity and resistance of the separator are degraded due to the addition of one or more functional layers (a heat-resistant layer, an adhesive layer, etc.) to one surface of the porous base film may be alleviated.

The content of the organic particles in the adhesive layer may be 50 to 99 wt %. When the content of the organic particles is less than 50 wt %, adhesiveness may not be imparted to a required level, and when the content of the organic particles is more than 99 wt %, the air permeability and ionic conductivity of the separator may be degraded, and the dispersibility of the organic particles may be degraded, or the workability and processability in coating may be degraded.

When the adhesive layer is disposed on the surface of the heat-resistant layer, the average particle diameter of the organic particles may be smaller than that of the inorganic particles included in the heat-resistant layer. When the average particle diameter of the organic particles is larger than that of the inorganic particles, the average pore size of the adhesive layer may be larger than the average particle diameter of the inorganic particles. In this case, as the heat-resistant layer is continuously exposed to an electrolyte in the battery, the inorganic particles may be partially and continuously detached from the porous substrate, and thus the heat resistance of the separator may also be gradually decreased.

The thickness of the adhesive layer may be 0.5 to 1.5 μm. When the thickness of the adhesive layer is less than 0.5 μm, adhesiveness may be degraded, and the exposure of the inorganic particles included in the heat-resistant layer to an electrolyte may not be effectively prevented. On the other hand, when the thickness of the adhesive layer is more than 1.5 μm, air permeability, ionic conductivity and resistance may be degraded, and the separator may become thicker to inhibit the formation of a smaller electrochemical device and the integration thereof.

As needed, to reinforce the heat resistance of the separator, the adhesive layer may further include inorganic particles like the heat-resistant layer. In the adhesive layer, the weight ratio of the organic particles and the inorganic particles may be 1:50 to 80. When the content of the inorganic particles is excessively low, a required level of heat resistance may not be imparted, and when the content of the inorganic particles is excessively high, the dispersibility of the inorganic particles may be degraded, or the workability and processability in coating may be degraded.

The water-soluble polymer may be melted or fused to the adhesive layer to bind the organic particles to each other, or when the adhesive layer includes a certain amount of inorganic particles, the inorganic particles may bind to each other, or not only the organic and inorganic particles may bind to each other, but the organic particles and/or the inorganic particles may be adhered to the heat-resistant layer. The type of available water-soluble polymer is the same as described for the binder of the heat-resistant layer.

The ratio of the thickness of the adhesive layer to the thickness of the heat-resistant layer may be 0.15 to 0.5. When the ratio of the thickness of the adhesive layer to the thickness of the heat-resistant layer is outside the above range, it is difficult to realize the balance between the heat resistance, adhesiveness, air permeability, ionic conductivity, and resistance of the separator. Specifically, when the ratio of the thickness of the adhesive layer to the thickness of the heat-resistant layer is less than 0.15, air permeability and resistance may be improved, but heat resistance and adhesiveness may be degraded. In contrast, when the ratio of the thickness is more than 0.5, air permeability and resistance may be reduced, but heat resistance and adhesiveness may be improved.

Generally, when the thickness and/or planar density (weight/unit area) of a heat-resistant layer and/or adhesive layer coated on the surface of the porous film is increased, heat resistance and adhesiveness are improved, but air permeability and resistance tend to deteriorate. That is, "heat resistance and adhesiveness" and "air permeability and resistance" are in a mutually incompatible relationship, a so-called trade-off relationship.

Accordingly, the separator according to the present invention may have a balance between heat resistance, adhesiveness, air permeability, and ionic conductivity as some of the organic particles included in the adhesive layer, that is, the water-insoluble polymer are used as annular hollow particles having a through hole in the middle. Specifically, since the through hole provides a path through which ions and/or a fluid can passes through, together with a plurality of pores formed by gaps between the organic particles, the conventional problem in which the air permeability, ionic conductivity and resistance of the separator are degraded due to the addition of one or more functional layers (a heat-resistant layer, an adhesive layer, etc.) to one surface of the porous base film may be alleviated.

Meanwhile, the porous film may be hydrophilized to sufficiently secure the wettability of a slurry when coating an aqueous slurry for forming the heat-resistant layer and/or the adhesive layer, thereby improving the binding strength between the porous film and the heat-resistant layer and/or the adhesive layer. The contact angle of the hydrophilized porous film to moisture ($H_2O$) may be 15° or less, and the absolute value of a zeta potential measured as a negative value (−) on the surface of the porous film may be 10 mV or more, preferably, 15 mV or more, and more preferably, 20 mV or more.

Since a hydrophilic group, e.g., $—SO_3$, generated on the surface of the hydrophilized porous film and the surface of an internal pore is hydrophilic, the hydrophilized porous film may be easily bonded with the heat-resistant layer and/or the adhesive layer due to high affinity for the slurry, which is intrinsically hydrophilic, and its binding strength may also be reinforced to considerably improve the durability of the separator, and since the loss of a hydrophilic group included in the porous film and/or inorganic particles of the heat-resistant layer, and organic particles of the adhesive layer may be prevented, air permeability, ionic conductivity, heat resistance, and adhesiveness are improved.

The separator may satisfy one or more of the following conditions (i) to (v), and preferably, all of the conditions (i) to (v): (i) $Fs \leq 190$ sec/100 mL (Fs is the air permeability of the separator); (ii) $Rs \leq 100$ mΩ (Rs is the resistance of the separator); (iii) thermal shrinkage of 2.5% or less at 150° C. in a machine direction; (iv) 0 sec/100 mL$<Fs-Fb\leq 20$ sec/100 mL (Fb is the air permeability of the base film); and (v) 0 mΩ$<Rs-Rb\leq 10$ mΩ (Rb is the resistance of the base film).

The air permeability (Fs) of the separator may be 190 sec/100 mL or less, preferably, 150 to 185 sec/100 mL, and more preferably, 160 to 180 sec/100 mL; the resistance (Rs) of the separator may be 100 mΩ or less, preferably, 95 mΩ or less, and more preferably, 80 to 92 mΩ; and the thermal shrinkage of the separator at 150° C. in a machine direction (MD) is 2.5% or less, and preferably, 2.2% or less; the difference (Fs-Fb) between the air permeability (Fs) of the separator and the air permeability (Fb) of the base film may be 0 to 20 sec/100 mL, preferably, 0 to 15 sec/100 mL, and more preferably, 1 to 10 sec/100 mL; and the difference (Rs-Rb) between the resistance (Rs) of the separator and the resistance (Rb) of the base film may be 0 to 10 mΩ, preferably, 0 to 7 mΩ, and more preferably, 0 to 4 mΩ.

Hereinafter, examples of the present invention will be described in detail.

Preparation Example 1

To a 5 MPa pressure vessel with an agitator, 75 parts by weight of methyl methacrylate as a (meth)acrylic acid ester monomer for forming the core of a solid particle, 4 parts by weight of methacrylic acid as a (meth)acrylic acid monomer, 1 part by weight of ethylene glycol dimethacrylate (EDMA) as a crosslinkable monomer, 1 part by weight of sodium dodecylbenzenesulfonate as an emulsifier, 150 parts by weight of an ion-exchange resin, and 0.5 parts by weight of potassium persulfate as a polymerization initiator were added, stirred sufficiently and heated to 60° C., thereby initiating polymerization.

When the polymerization conversion rate reached 96%, 19 parts by weight of styrene as an aromatic vinyl monomer for forming the shell of a solid particle and 1 part by weight of methacrylic acid as an acid group-containing monomer were added continuously, and heated to 70° C., thereby continuing polymerization.

At the time when the polymerization conversion rate of the monomers before addition reached 96%, the resultant was cooled to 60° C. and aged for 24 hours, thereby increasing the average particle diameter of the synthesized solid particles, and thus an aqueous dispersion in which some of the solid particles were converted into annular hollow particles was obtained. A coating composition was prepared by adding polyvinyl alcohol to the aqueous dispersion and diluting the resulting solution with water to have a solid content of 5 wt %. The content of the polyvinyl alcohol in the solid content is 5 wt %.

Preparation Example 2

A coating composition was prepared in the same manner as in Preparation Example 1, except that the average particle diameter of the synthesized solid particles was increased by cooling to 60° C. at the time when the polymerization conversion rate of the monomers before addition reached 96% and aging for 20 hours, and an aqueous dispersion in which some of the solid particles were converted into annular hollow particles was obtained.

Preparation Example 3

A coating composition was prepared in the same manner as in Preparation Example 1, except that the average particle diameter of the synthesized solid particles was increased by cooling to 60° C. at the time when the polymerization conversion rate of the monomers before addition reached 96% and aging for 16 hours, and an aqueous dispersion in which some of the solid particles were converted into annular hollow particles was obtained.

Preparation Example 4

A coating composition was prepared in the same manner as in Preparation Example 1, except that the average particle diameter of the synthesized solid particles was increased by cooling to 60° C. at the time when the polymerization conversion rate of the monomers before addition reached 96% and aging for 14 hours, and an aqueous dispersion in which some of the solid particles were converted into annular hollow particles was obtained.

Preparation Example 5

A coating composition was prepared in the same manner as in Preparation Example 1, except that the average particle diameter of the synthesized solid particles was increased by cooling to 60° C. at the time when the polymerization conversion rate of the monomers before addition reached 96% and aging for 8 hours, and an aqueous dispersion in which some of the solid particles were converted into annular hollow particles was obtained.

Comparative Preparation Example 1

To a 5 MPa pressure vessel with an agitator, 75 parts by weight of methyl methacrylate as a (meth)acrylic acid ester monomer for forming the core of a solid particle, 4 parts by weight of methacrylic acid as a (meth)acrylic acid monomer, 1 part by weight of ethylene glycol dimethacrylate (EDMA) as a crosslinkable monomer, 1 part by weight of sodium dodecylbenzenesulfonate as an emulsifier, 150 parts by weight of an ion-exchange resin, and 0.5 parts by weight of potassium persulfate as a polymerization initiator were added, stirred sufficiently and heated to 60° C., thereby initiating polymerization.

When the polymerization conversion rate reached 96%, 19 parts by weight of styrene as an aromatic vinyl monomer for forming the shell of a solid particle and 1 part by weight of methacrylic acid as an acid group-containing monomer were added continuously, and heated to 70° C., thereby continuing polymerization. At the time when the polymerization conversion rate of the monomers before addition reached 96%, the reaction was stopped to obtain an aqueous dispersion including solid particles, and the resulting dispersion was diluted with water to have a solid content of 5 wt % and then a small amount of surfactant was added, thereby preparing a coating composition.

Comparative Preparation Example 2

A coating composition was prepared in the same manner as in Preparation Example 1, except that the average particle diameter of the synthesized solid particles was increased by cooling to 60° C. at the time when the polymerization conversion rate of the monomers before addition reached 96% and aging for 5 hours, and an aqueous dispersion in which some of the solid particles were converted into annular hollow particles was obtained.

Comparative Preparation Example 3

A coating composition was prepared in the same manner as in Preparation Example 1, except that the average particle diameter of the synthesized solid particles was increased by cooling to 60° C. at the time when the polymerization conversion rate of the monomers before addition reached 96% and aging for 30 hours, and an aqueous dispersion in which some of the solid particles were converted into annular hollow particles was obtained.

Experimental Example 1

The compositions of a solid particle and a annular hollow particle in each aqueous dispersion obtained in each of Preparation Examples and Comparative Preparation Examples were analyzed and shown in Table 1 below. The solid particles were divided into first solid particles having an average particle diameter of 0.3 μm or less and second solid particles having an average particle diameter of more than 0.3 μm, and the compositions thereof were analyzed.

TABLE 1

| Classification | Annular hollow particle | First solid particle | Second solid particle |
|---|---|---|---|
| Preparation Example 1 | 50 | 35 | 15 |
| Preparation Example 2 | 40 | 40 | 20 |
| Preparation Example 3 | 32 | 53 | 15 |
| Preparation Example 4 | 25 | 50 | 25 |
| Preparation Example 5 | 10 | 75 | 15 |
| Comparative Preparation Example 1 | 0 | 0 | 100 |
| Comparative Preparation Example 2 | 5 | 15 | 75 |
| Comparative Preparation Example 3 | 55 | 35 | 10 |

(Units: wt %)

Figure 4:
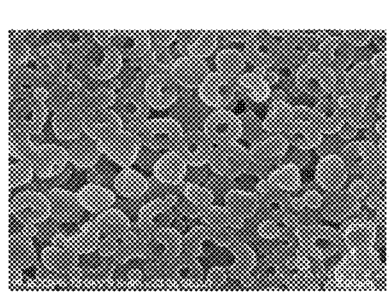
FIG. 4 is a set of SEM images of coating compositions according to Examples and Comparative Examples of the present invention.
Figure 4:
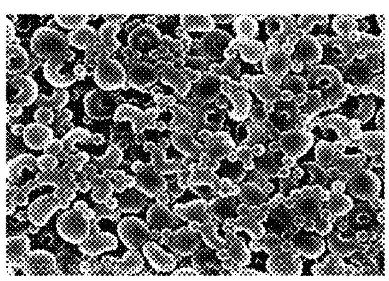
Figure 4:
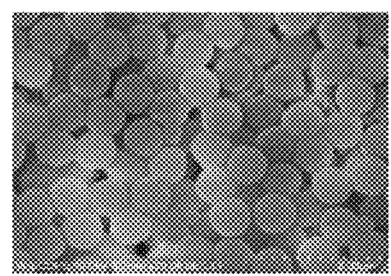

FIG. 4 is a set of SEM images of aqueous dispersions according to Preparation Examples and Comparative Preparation Examples. Referring to FIG. 4, in the aqueous dispersions according to Preparation Examples 3 and 5, both solid particles and annular hollow particles were observed, whereas in the aqueous dispersion according to Comparative Preparation Example 1, the annular hollow particles observed in Preparation Examples 3 and 5 were not observed.

Example 1

A ceramic slurry was prepared by mixing a solid content including 95 wt % of boehmite (AlOOH) having an average particle diameter of 500 nm, 3 wt % of an acrylonitrile copolymer, and 2 wt % of polyvinyl alcohol and distilled water in a weight ratio of 20:80, and uniformly dispersing the resulting mixture.

A base film including a heat-resistant layer was obtained by bar coating one surface of a 9-μm polyethylene porous substrate (air permeability: 110 sec/100 mL) with the ceramic slurry to a thickness of 3 μm.

A separator sequentially including a porous substrate, a heat-resistant layer, and an adhesive layer was obtained by bar coating the heat-resistant layer with the coating composition obtained in Preparation Example 1 to a thickness of 0.5 μm and drying the coated result.

Example 2

A separator including a porous substrate, a heat-resistant layer, and an adhesive layer was obtained in the same manner as in Example 1, except that a heat-resistant layer was coated with the coating composition obtained in Preparation Example 2 to a thickness of 0.5 μm, and the coated result was dried.

Example 3

A separator including a porous substrate, a heat-resistant layer, and an adhesive layer was obtained in the same manner as in Example 1, except that a heat-resistant layer was coated with the coating composition obtained in Preparation Example 3 to a thickness of 0.5 μm, and the coated result was dried.

Example 4

A separator including a porous substrate, a heat-resistant layer, and an adhesive layer was obtained in the same manner as in Example 1, except that a heat-resistant layer was coated with the coating composition obtained in Preparation Example 4 to a thickness of 0.5 μm, and the coated result was dried.

Example 5

A separator including a porous substrate, a heat-resistant layer, and an adhesive layer was obtained in the same manner as in Example 1, except that a heat-resistant layer was coated with the coating composition obtained in Preparation Example 5 to a thickness of 0.5 μm, and the coated result was dried.

Comparative Example 1

A separator including a porous substrate, a heat-resistant layer, and an adhesive layer was obtained in the same manner as in Example 1, except that a heat-resistant layer was coated with the coating composition obtained in Comparative Preparation Example 1 to a thickness of 0.5 μm, and the coated result was dried.

Comparative Example 2

A separator including a porous substrate, a heat-resistant layer, and an adhesive layer was obtained in the same manner as in Example 1, except that a heat-resistant layer was coated with the coating composition obtained in Comparative Preparation Example 2 to a thickness of 0.5 μm, and the coated result was dried.

Comparative Example 3

A separator including a porous substrate, a heat-resistant layer, and an adhesive layer was obtained in the same manner as in Example 1, except that a heat-resistant layer was coated with the coating composition obtained in Comparative Preparation Example 3 to a thickness of 0.5 μm, and the coated result was dried.

Experimental Example 2

Test methods for each of the physical properties measured in the present invention are as follows. When there is no separate mention about temperatures, the physical properties were measured at room temperature (25° C.).

The physical properties of the base film and separator specimens prepared according to Examples and Comparative Examples were measured. The results are shown in Tables 2 and 3 below.

Air permeability (Gurley, sec/100 mL): The time for passing 100 mL of air through each of the base film and separator specimens having a diameter of 29.8 mm under a measurement pressure of 0.025 MPa was measured using an EGO2-5 model, which is a Gurley meter (Densometer, Asahi Semiko Co., Ltd.).

Resistance (mΩ): An electrolyte was prepared by dissolving 1 mol of $LiPF_6$ in a solvent in which ethylene carbonate, propylene carbonate, and propyl propionate were mixed in a ratio of 25:10:65 (volume ratio). After immersing each separator in the electrolyte, a coin cell was manufactured, and resistance was measured using an electrochemical impedance spectroscopy (EIS) meter.

Thermal shrinkage (%): After the separator specimen with a size of 200×200 mm was put between sheets of A4 paper and left in a 150° C. oven for 1 hour, the separator specimen was cooled at room temperature, and the length of the specimen shrunken in a machine direction (MD) was measured, and thermal shrinkage was calculated using the following equation.

$$\text{Thermal shrinkage }(\%)=(l_3-l_4)/l_3*100$$

(In the equation, $l_3$ is a machine direction (MD) length of the specimen before shrinkage, and $l_4$ is a machine direction (MD) length of the specimen after shrinkage.)

TABLE 2

| Classification | Example 1 | Example 2 | Example 3 | Example 4 | Example 5 |
|---|---|---|---|---|---|
| Air permeability of base film (Fb) | 170 | 170 | 170 | 170 | 170 |
| Air permeability of separator (Fs) | 172 | 177 | 180 | 184 | 187 |
| Fs-Fb | 2 | 7 | 10 | 14 | 17 |
| Resistance of base film (Rb) | 88 | 88 | 88 | 88 | 88 |
| Resistance of separator (Rs) | 89.8 | 90.1 | 91.9 | 93.1 | 95.3 |
| Rs-Rb | 1.8 | 2.1 | 3.9 | 5.1 | 7.3 |
| Thermal shrinkage (%) | 2.5 | 2.2 | 2.1 | 1.9 | 1.6 |
| Ionic conductivity (mS/cm) | $8.92 \times 10^{-4}$ | $6.61 \times 10^{-4}$ | $6.01 \times 10^{-4}$ | $5.91 \times 10^{-4}$ | $5.85 \times 10^{-4}$ |

TABLE 3

| Classification | Comparative Example 1 | Comparative Example 2 | Comparative Example 3 |
|---|---|---|---|
| Air permeability of base membrane (Fb) | 170 | 170 | 170 |
| Air permeability of separator (Fs) | 192 | 189 | 171 |
| Fs-Fb | 22 | 19 | 1 |
| Resistance of base film(Rb) | 88 | 88 | 88 |
| Resistance of separator(Rs) | 124.9 | 112.1 | 89.6 |
| Rs-Rb | 36.9 | 24.1 | 1.6 |
| Thermal shrinkage (%) | 1.8 | 2.6 | 2.9 |
| Ionic conductivity (mS/cm) | $4.35 \times 10^{-4}$ | $5.55 \times 10^{-4}$ | $9.10 \times 10^{-4}$ |

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as being illustrative and not restrictive in any aspect. For example, each component described as a single unit may be distributed and implemented, and components described as being distributed may also be implemented in combined form.

The scope of the present invention is defined by the appended claims, and it should be interpreted that the scope of the present invention encompasses all modifications and alterations derived from the meanings, scope and equivalents of the appended claims.

<Description of Reference Numerals>

10: Solid particle
11: Core

-continued

| <Description of Reference Numerals> |
|---|
| 12: Shell |
| 20: Annular hollow particle |
| 21: Annular shell |
| 22: Through hole |
| 23: Filling material |
| 24: Hollow |

The invention claimed is:

1. A coating composition for a separator, comprising a water-soluble polymer and a water-insoluble polymer,
   - wherein the water-insoluble polymer comprises solid particles and annular hollow particles,
   - wherein the solid particles have a core-shell structure comprising a core, and a shell covering at least a part of the surface of the core,
   - wherein the annular hollow particles comprise an annular shell in which a through hole is formed that passes from one point on an outer surface of the annular shell to another point on the outer surface of the annular shell, and the annular shell comprises a filling material and a hollow therein, and
   - wherein the annular hollow particles are derived from the solid particles.

2. The coating composition of claim 1, wherein the solid particle comprises first solid particles having an average particle diameter of 0.3 μm or less, and second solid particles having an average particle diameter of more than 0.3 μm.

3. The coating composition of claim 2, wherein the average diameter of the through hole is larger than the average particle diameter of the first solid particles.

4. The coating composition of claim 3, wherein the proportion of the filling material in the annular shell is 1 to 99 vol %.

5. The coating composition of claim 1, wherein the content of the annular hollow particles in the water-insoluble polymer is 10 to 50 wt %.

6. A separator, comprising:
   - a porous base film; and
   - an adhesive layer disposed on at least one surface of the porous base film and made of the coating composition for a separator of claim 1.

7. The separator of claim 6, wherein the porous base film comprises a porous substrate, and a heat-resistant layer disposed on at least one surface of the porous substrate and comprising a plurality of inorganic particles bound by a binder.

8. The separator of claim 6, which satisfies one or more of the following conditions (i) to (v):
   - (i) Fs≤190 sec/100 mL (Fs is the air permeability of the separator);
   - (ii) Rs≤100 mΩ (Rs is the resistance of the separator);
   - (iii) thermal shrinkage of 2.5% or less at 150° C. in a machine direction;
   - (iv) 0 sec/100 mL<Fs−Fb≤20 sec/100 mL (Fb is the air permeability of the base film); and
   - (v) 0 mΩ<Rs−Rb≤10 mΩ (Rb is the resistance of the base film).

* * * * *